United States Patent [19]

Carlson et al.

[11] 3,911,341

[45] Oct. 7, 1975

[54] SWITCHING TYPE MOTOR SPEED CONTROL

[75] Inventors: Daniel P. Carlson, Toledo, Ohio; James T. Hardin, Lambertville, Mich.

[73] Assignee: Eltra Corporation, New York, N.Y.

[22] Filed: Sept. 20, 1974

[21] Appl. No.: 507,898

[52] U.S. Cl. ............................... 318/341; 318/345
[51] Int. Cl.² .......................................... H02P 5/34
[58] Field of Search ............................ 318/341, 345

[56] References Cited
UNITED STATES PATENTS

| | | | |
|---|---|---|---|
| 3,427,506 | 2/1969 | Thiele .............................. | 318/341 X |
| 3,441,827 | 4/1969 | Payne .............................. | 318/341 X |
| 3,617,845 | 11/1971 | McKenna ........................... | 318/341 |
| 3,855,520 | 12/1974 | Stich ............................... | 318/341 X |

*Primary Examiner*—G. Z. Rubinson
*Attorney, Agent, or Firm*—Keith D. Moore

[57] ABSTRACT

Energy from a battery is supplied to a DC motor in a series of voltage pulses by a circuit having a plurality of transistor switches which are alternately rendered conductive and nonconductive by control signals from a free-running multivibrator, and the speed of the motor is controlled by varying the duty cycle of the multivibrator so as to vary the duration of the voltage pulses being supplied to the motor. To avoid the destruction of any of the transistor switches, the circuit has over-current protection means which is responsive to excessive current through any of the transistor switches for resetting the multivibrator to bias the transistor switches nonconductive and causing the voltage pulses to be supplied to the motor at a higher frequency resulting in an increased motor impedance which limits the current through the transistor switches. To prevent a declining battery potential from reducing the effectiveness of the control signals alternately biasing the transistor switches fully conductive or nonconductive, the circuit is provided with low voltage protection means which is responsive to a first low battery voltage for resetting the multivibrator to bias the transistor switches nonconductive and continuing that condition until the battery potential rises to a second voltage level.

4 Claims, 1 Drawing Figure

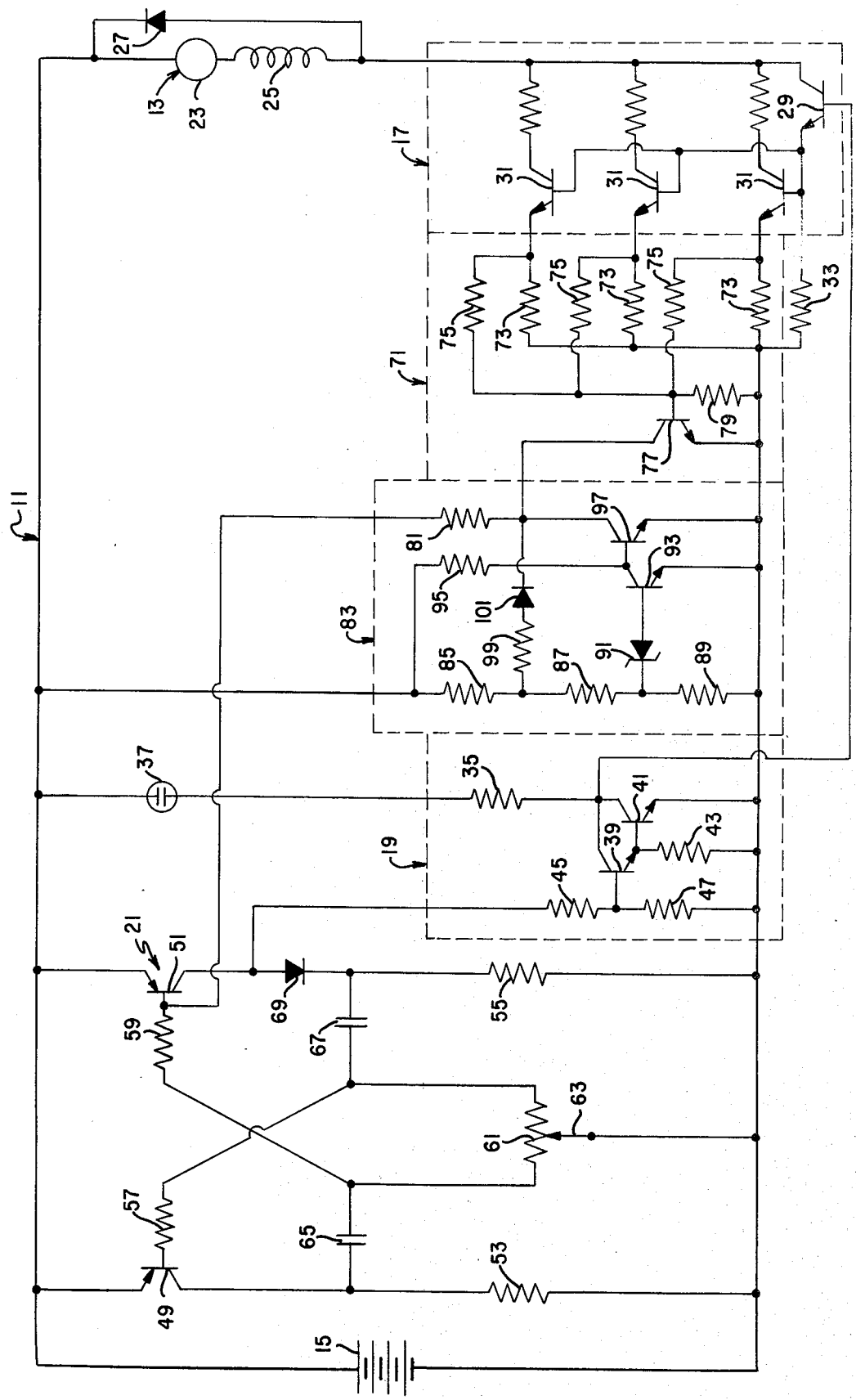

SWITCHING TYPE MOTOR SPEED CONTROL

This invention relates to a circuit for controlling the speed of a motor used to drive an electrically-powered vehicle, for example a car or boat, and more particularly to a motor control circuit for operating a DC motor from a battery power source.

In controlling the speed of a motor operating from an energy source having a substantially constant voltage, the motor is oftentimes connected to the power source by a control circuit having a variable impedance device for limiting the voltage applied to the motor. However, such an arrangement is disadvantageous when the motor is used to drive a vehicle and must operate from a limited energy source such as a battery because the dissipation of power by the variable impedance device necessarily reduces the amount of energy available for operating the motor. Instead, it is desirable to minimize the power consumed by the control circuit so that the amount of energy available to operate the motor will be increased thereby enhancing the performance capabilities of vehicles, and for this purpose control circuits have been provided using transistors as switches to supply energy to the motor in a succession of voltages pulses with the speed of the motor being controlled by varying the duration of the voltages pulses and hence the average amount of power supplied to the motor. Such an arrangement is shown, for example, in U.S. Pat. No. 3,243,681.

However, in using transistors as switching in a switch type motor control circuit, it is important for the transistor to be biased into either nonconductive or saturated conditions, because the operation of the transistor in an unsaturated condition may cause excessive power dissipation resulting in their destruction. Since only a limited energy supply is available, the operation of the motor over an extended period of time may lower the supply voltage so that the transistor switches are no longer biased into saturation, resulting in excessive power dissipation by the transistor. In addition, the transistors are subject to damage by excessive current such as may occur in the event of a locked motor rotor, and in such a situation it is desirable to limit the motor load current conducted by the transistor. Moreover, since the load current may be shared among several transistors, the magnitude of the load current may not represent the current through each of the transistors resulting in one or more of the transistors conducting an excessive amount of current and being destroyed.

Accordingly, an object of the present invention is to provide a switching type motor control circuit using a plurality of transistor switches for conducting the load current of the motor with means for protecting each of the transistors against excessive overcurrent.

Another object of the invention is to provide a switching type motor control circuit with low voltage protection to ensure sufficient biasing for the transistor switch means to operate in a saturated condition.

Still other objects, features and advantages of the present invention will become apparent to those skilled in the art from a reading of the following detailed description of a preferred embodiment of the invention, taken in conjunction with the accompanying drawing showing a single schematic diagram of a switching type motor control circuit according to the present invention.

Referring now in detail to the FIGURE in the drawing, there is shown a motor control circuit, generally indicated 11, for operating a DC motor, generally indicated 13, from a limited energy source in the form of a battery 15. The motor 13 is connected in series with the battery 15 by transistor switch means, generally indicated 17, for controlling the supply of energy to the motor 13, and the switch means 17 is alternately rendered conductive and nonconductive by control signals which are supplied through an amplifier, generally indicated 19, from a multivibrator, generally indicated 21, so as to supply energy to the motor 13 in a series of voltage pulses with a minimum amount of power dissipation by the transistor switch means 17. The duration of the conductive period of the switch means 17 and hence the duration of the voltage pulses supplied to the motor 13 is determined by the duty cycle of the multivibrator 19 which is subject to manual control, and the speed of the motor 13 is controlled by varying the duty cycle of the multivibrator 19 so as to change the conductive time of the switch means 17 and hence the average amount of energy being supplied to the motor 13.

As shown, the motor 13 has an armature 23 and field winding 25 which are connected in series with the battery 15, and a free wheeling diode 27 is connected across the motor 13 to provide a path for the inductive current of the motor 13 when the switch means 17 is rendered nonconductive. The switch means 17 includes an NPN transistor 29 connected in cascade with a plurality of similar NPN transistors, all indicated 31, which are connected in parallel with each other. The emitter of the NPN transistor 29 is connected to the negative terminal of the battery 15 by a resistor 33 and to the base terminals of the parallel connected transistors 31. The control signals provided by the multivibrator 21 are supplied to the base of the transistor 29 through the amplifier 19 which is connected across the terminals of the battery 15 in series with a voltage dropping resistor 35 and a temperature responsive switch 37 for disconnecting the amplifier 19 and interrupting the control signals supplied to the switch means 17 in the event of excessive temperature. The amplifier 19 includes two NPN transistors 39,41 which are arranged in a Darlington configuration with the collectors sistor 39 connected directly to the base of the transistor 41 and to the emitter through a resistor 43. The control signals from the multivibrator 21 are applied to the base of the transistor 39 through a voltage dropping resistor 45 which is connected in series with a resistor 47 to the negative terminal of the battery 15, and the amplified control signals are supplied to the switch means 17 from the collector of the transistor 41.

The multivibrator 21 providing the control signals to the switch means 17 is a conventional free-running multivibrator having a selectively variable duty cycle. As shown, the multivibrator 21 includes two PNP transistors 49, 51 each connected in series with a corresponding resistor 53, 55 respectively across the terminals of the battery 15, and with the base electrodes connected by resistors 57, 59 respectively to opposite ends of a potentiometer 61 having a wiper 63 connected to the negative terminal of the battery 15. In addition, the collector electrodes of transistors 49, 51 are coupled to the base electrodes of each other by capacitors 65, 67 respectively which are also connected to the opposite ends of the potentiometer 61, and the control signals for the switching means 17 are provided by connecting the voltage dropping resistor 45 of the amplifier 19 to the collector of the transistor 51 with a diode 69 connected between the capacitor 67 and the transistor 51 to prevent the resistors 45, 47 from providing the capacitor 67 with a charging path. The operation of the multivibrator 21 is conventional with each of the transistors 49, 51 being alternately biased into conduction as a result of the alternate charging and discharging of the coupling capacitors 65, 67. Assuming that the conduction of transistor 49 is increasing, an increasing collector potential is applied through the capacitor 65 to bias the transistor 51 nonconductive resulting in a decreasing collector potential being applied through the capacitor 67 to bias the transistor 49 into saturation. As the transistor 49 is conducting, its forward bias is reduced by the charging of the capacitor 67, while the reverse bias of the transistor 51 is reduced by the discharging of the capacitor 65 through the potentiometer 61, and after a period of time the transistor 51 will begin to conduct with the process reversing itself until transistor 51 is biased into saturation while the transistor 49 is rendered nonconductive.

The control signals provided by the multivibrator 21 are essentially in the form of train of square waves having a substantially constant repetition rate for alternately biasing the transistor switch means 17 conductive and nonconductive. When the transistor 51 of the multivibrator 21 is conducting an "OFF" signal is provided through the amplifier 19 for biasing the transistors 31 of the switch means 17 nonconductive, and when the transistor 51 is not conducting an "ON" signal is provided for forwardly biasing the transistors 31 into saturation. As discussed above, the speed of the motor 13 is determined by the time duration of the voltage pulses supplied through the switch means 17 and is therefore dependent upon the time ratio of the control signals depends on the duty cycle of the multivibrator 21 as determined by the position of the wiper 63 of the potentiometer 61 which is subject to manual control. Accordingly, by varying the position of the wiper 63, the duty cycle of the multivibrator 21 may be changed to produce an accompanying change in the speed of the motor 13.

As the duty cycle of the multivibrator 21 is increased so as to accelerate the motor 13, the current being supplied to the motor 13 by the switch means 17 is increased to the point where one or more of the transistors 31 may be destroyed as a result of excessive current in the event of a locked rotor of the motor 13. To prevent the destruction of the switch means 17, the control circuit 11 is provided with overcurrent protection means, generally indicated 71, which responds to excessive current through any of the transistors 31 for resetting the multivibrator 21 to provide an "OFF" signal to the switch means 17, thereby interrupting the current through the transistors 31. As shown, the overcurrent protection means 71 includes a plurality of resistors 73, each connected in series with a corresponding transistor 31, so as to provide current signals in the form of the voltage drops across the resistors 73 which are indicative of the current flowing through the corresponding transistors 31. The current signals provided by the resistors 73 are applied across corresponding voltage dividers formed by resistors 75 connected to the base of an NPN transistor 77 in series with a resistor 79 connected to the negative terminal of the battery 15. The transistor 77 is connected through a current limiting resistor 81 to the base of the transistor 51 of the multivibrator 21, and when the current through any of the transistors 31 exceeds a predetermined magnitude, the resulting current signal biases the transistor 77 into conduction to reset the multivibrator 21 by biasing the transistor 51 into conduction. As discussed above, the conduction of transistor 51 provides an "OFF" signal which renders the switch means 17 nonconductive.

In the operation of the overcurrent protection means 71, the multivibrator 21 will continue to provide alternate "OFF" and "ON" signals to the switch means 17, and as long as an excessive amount of current is conducted through any of the transistors 31, the multivibrator 21 will be repeatedly reset to supply an "OFF" signal to the switch means 17. However, the early termination of the "ON" signal results in the voltage pulses being supplied to the motor 13 at a rate greater than the normal operating frequency of the multivibrator 21, and since the impedance of the motor 13 is a function of the frequency of the voltage pulse being supplied to it, the effective impedance of the motor 13 increases so as to limit the current through the switch means 17. Subsequently, when the cause of the excessive voltage is corrected, the motor 13 will again be supplied with current pulses at the normal operating frequency of the multivibrator 21 and with durations in accordance with the setting of the potentiometer 61.

Since the motor 13 is being operated from a limited energy source in the form of battery 15, eventually the battery 15 may become discharged to the point where the control signals supplied to the switch means 17 form the amplifier 19 will be insufficient to bias the transistors 31 into saturation, thereby increasing the power dissipation through the transistors 31 with the resulting possibility of destruction. To prevent the destruction of the transistors 31, the control circuit 11 is provided with low voltage protection means, generally indicated 83 which responds to a low voltage condition for resetting the multivibrator 21 to provide an "OFF" signal to the switch means 17, thereby interrupting the current through the transistors 31. As shown, the low voltage protection means 83 includes a voltage divider of three resistors 85, 87, 89 which are connected in series across the terminals of the battery 15 with the voltage drop across the resistor 89 providing a voltage signal which is indicative of the potential being supplied to the motor control circuit 11. The voltage signal is applied to the base of an NPN transistor 93 which is connected 87, 89 of the voltage divider for controlling the bias applied to the base of another NPN transistor 97 which is connected to the resistor 81 for resetting the multivibrator 21 in the same manner as the overcurrent protection means 71. When the potential of the battery 15 is adequate for operating the control circuit 11, then the voltage signal exceeds the threshold voltage of the Zener diode 91 and biases the transistor 93 into conduction which renders the transistor 97 nonconductive. However, when the voltage signal is indicative of an inadequate battery potential, then it no longer exceeds the breakdown voltage of the Zener diode which becomes nonconductive and renders the transistor 93 nonconductive. As a result, the transistor 97 is forwardly biased into conduction thereby resetting the multivibrator 21 to provide an "OFF" signal to the switch means 17 which interrupts the supply of current to the motor 13.

However, the control circuit 11 may be operated to produce a sudden increase in the current being supplied to the motor 13, and the resulting current surge through the battery 15 produces an internal voltage drop which lowers the battery potential sensed by the low voltage protection means 83. If the battery potential has previously declined to about the threshold value at which the low voltage protection means 83 operates to interrupt the current to the motor 13, then the sudden surge of current may reduce the battery potential below the threshold value and initiate the operation of the low voltage protection means 83. However, the operation of the low voltage protection means 83 in response to the battery potential rising and falling past a single threshold value may lead to an undesirable "ON-OFF" cycling of the motor 13 because the interruption of the current removes the internal voltage drop of the battery 15 with a resulting increase in battery potential above the threshold value which enables current to again be supplied to the motor 13 whereupon another current surge will again initiate the operation of the low voltage protection means 83 to interrupt the current.

To prevent the undesirable "ON" and "OFF" cycling of the motor 13, the low voltage protection means 83 is provided with a hysteresis effect whereby its operation is continued until the battery potential increases to a value greater than the theshold value discussed above. As shown, the hysteresis effect is created by connecting a resistor 99 between the resistors 85, 87 and the junction of the resistor 81 and transistor 97 so as to shunt a portion of the current from the voltage dividing resistor 89 when transistor 97 is biased into conduction, and a diode 101 is also connected in series with the resistor 99 to prevent a current path through the resistors 81 and 99 from affecting the operation of the multivibrator 21. Accordingly, when the operation of the low voltage protection means 83 is initiated, the conduction of the transistor 97 effects a reduction of the voltage signal so as to necessitate an additional increase in the battery potential before the voltage signal again exceeds the breakdown voltage of the Zener diode 91 to render the transistor 97 nonconductive, thereby discontinuing the operation of the low voltage protection means 83.

What is claimed is:

1. A circuit for controlling the speed of a DC motor, comprising:
   a free running multivibrator alternately providing first and second control signals at a substantially constant predetermined frequency and with a time ratio determined by the duty cycle of the multivibrator,
   switch means for connecting the motor to a source of direct current and being electrically conductive in response to said first control signal and electrically nonconductive in response to said second control signal for supplying energy to said motor in a succession of voltage pulses corresponding to the predetermined frequency of said multivibrator and having a duration determined by the duty cycle of said multivibrator,
   manual control means for selectively varying the duty cycle of said multivibrator to control the average voltage being supplied to the motor,
   current sensing means providing a current signal indicative of the current being supplied to the motor by said switch means,
   overcurrent protection means operable in response to the current signal exceeding a predetermined value for resetting said multivibrator to provide said switch means with a second control signal whereby voltage is supplied to said motor in a succession of pulses at a frequency greater than the predetermined frequency of the multivibrator and with a duration different from the duty cycle determined by the manual control means.

2. In a circuit according to claim 1:
   said switch means including a plurality of semiconductor switch means each adapted to conduct a portion of the current supplied to the motor,
   said current sensing means including a plurality of current sensing resistors each connected in series with a different semiconductor switch means to provide a current signal indicative of the current being conducted by the corresponding semiconductor switch means, and
   said overcurrent protection means being responsive to any of the current signals exceeding said predetermined value for resetting said multivibrator to provide a second control signal to said switch means.

3. In a circuit according to claim 1, the combination further comprising:
   voltage sensing means providing a voltage signal indicative of the potential of the energy source from which voltage is supplied to the motor, and
   low voltage protection means operable in response to the voltage signal declining to a predetermined value for resetting said multivibrator to provide a second control signal to said switch means.

4. In a circuit to claim 3, the combination further comprising:
   hysteresis means responsive to the operation of said low voltage protection means for reducing the value of the voltage signal provided by said voltage sensing means, and
   said low voltage protection means being operable in response to the voltage signal increasing to said predetermined value for enabling said multivibrator to alternately provide said first and second control signals to said switch means.

* * * * *